United States Patent
Yaker (12) 
(10) Patent No.: US 6,230,186 B1
(45) Date of Patent: *May 8, 2001

(54) PRIVATE ELECTRONIC MESSAGE SYSTEM

(76) Inventor: Rhoda Yaker, 240 Hamden Rd., Annandale, NJ (US) 08801

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,566

(22) Filed: Apr. 28, 1998

(51) Int. Cl.[7] ................................................ G06F 15/16
(52) U.S. Cl. ......................... 709/206; 709/238; 709/245
(58) Field of Search .................................. 709/206, 231, 709/238, 245

(56) References Cited

U.S. PATENT DOCUMENTS

| | | | |
|---|---|---|---|
| 4,994,985 | * | 2/1991 | Cree et al. . |
| 5,081,678 | * | 1/1992 | Kaufman et al. ...................... 380/21 |
| 5,548,646 | * | 8/1996 | Aziz et al. ............................. 380/23 |
| 5,568,540 | * | 10/1996 | Greco et al. ........................... 379/89 |
| 5,751,814 | * | 5/1998 | Kafri ...................................... 380/49 |
| 5,790,790 | * | 8/1998 | Smith et al. ......................... 709/206 |
| 5,870,548 | * | 2/1999 | Nielsen ................................ 709/206 |
| 5,878,230 | * | 3/1999 | Weber et al. ........................ 709/238 |
| 5,898,784 | * | 4/1999 | Kirby et al. ............................ 380/49 |
| 5,903,723 | * | 5/1999 | Beck et al. ............................. 707/10 |
| 5,917,489 | * | 6/1999 | Thurlow et al. ..................... 345/347 |
| 5,948,058 | * | 9/1999 | Kudoh et al. ........................ 709/206 |
| 5,958,005 | * | 9/1999 | Thorne et al. ....................... 709/202 |

* cited by examiner

Primary Examiner—Saleh Najjar
(74) Attorney, Agent, or Firm—Jumbopatent.com; I. Ionescu

(57) ABSTRACT

A private message, formed generally by an e-mail manager or browser, has a privacy attribute. The private message with the privacy attribute is transmitted to a receiver where only certain permitted message processing, called private message processing, may be performed in response to the detection of the privacy attribute.

For example, in response to a received privacy attribute only three message processing functions in the receiver of the message are activated, namely message reading, reply to addressee, and delete. Other edit and re-transmit functions which may exist with an e-mail manager or browser at the receiver are disabled in response to the privacy attribute so that the private message cannot be edited and retransmitted. Likewise, the message cannot be stored external from the e-mail manager or browser.

43 Claims, 7 Drawing Sheets

PRIVATE ELECTRONIC MESSAGE SYSTEM

FIELD OF INVENTION

This invention relates to the field of private electronic mail (e-mail) communications to be used with a network of interconnected computers, generally known as intranets or internet and typically using TCP/IP protocols.

BACKGROUND OF THE INVENTION

Networks of interconnected computers generally exchange messages formed from digital data. The digital date is made up of digital bits. For better organization, the bits are grouped generally in packets. Each packet is a conveniently sized group of bits traveling together as a unit within a transmission medium. A message is generally made up of one or more packets. When a message is longer than one packet, a plurality of packets are created to carry the message. Each packet forming the message is transmitted, possibly out of order, eventually reaching its destination where the message is extracted from the plurality of packets. When it is permissible for packets to be transmitted or received out of order, a grouping of one or more packets, part of the same message, are called datagrams. A datagram is a unit of data, manipulated as an entity by a data exchange protocol.

Electronic mail or e-mail is formed from the exchange of packets or datagrams by message processing functions. These functions are generally contained within e-mail managers and/or browsers. E-mail messages can contain any binary string as a representation ranging from plain ASCH text to a sequence of video images and/or sound.

Typically, e-mail managers or browsers strive to offer maximum flexibility to the user for the transmission and manipulation of incoming or outgoing messages. These typical application packages provide facilities for editing (cut and paste) and retransmission of a received e-mail message. Generally, only one click of the mouse, or a few keystrokes are required to edit and re-transmit a received message.

Moreover, the flexibility to edit and redistribute a received message in current e-mail managers and browsers sometimes works against the interests of the sender. In certain situations, retransmission of a received message may be injurious to the sender. For example, certain authoring rights associated with copyrighted materials may be diluted or infringed by indiscriminate and unlicensed e-mail editing and re-distribution of the original copyrighted material. Along the same lines, unfettered e-mail distribution of certain confidential lists containing, for example, personal information such as, employment, medical, credit and/or criminal records and the like may also be damaging to the privacy of those listed.

SUMMARY OF THE INVENTION

The difficulties related to easy e-mail manipulation are avoided in accordance with the principles of the invention by providing a system for the transmission of a private message from a sender to a receiver. A private message, formed generally by an e-mail manager or browser, has a privacy attribute. The private message with the privacy attribute is transmitted to a receiver where only certain permitted message processing, called private message processing, may be performed in response to the detection of the privacy attribute.

For example, in response to a received privacy attribute only three message processing functions in the receiver of the message are activated, namely message reading, reply to addressee, and delete. Other edit and re-transmit functions which may exist with an e-mail manager or browser at the receiver are disabled in response to the privacy attribute so that the private message cannot be edited and retransmitted. Likewise, the message cannot be stored external from the e-mail manger or browser.

In one embodiment of the invention, a message is formed from one or more packets. A privacy attribute is inserted into at least one of the packets. The packets containing the privacy attribute are transmitted from the sender to the receiver. Each of the packets has a header part and a data part, and are compatible with a transmission protocol, such as Transmission Control and/or Internet protocols (TCP/IP). The packets are sent to the receiver. The receiver has means for receiving the packets in accordance with the transmission protocol. The receiver searches the received packets for an occurrences of the privacy attribute. An output is generated upon detection of the privacy attribute in the received packets.

In response to the output, one or more message processing functions that are generally part of the browser and/or e-mail manager residing at the receiver are disabled. Alternatively, only those messages processing functions that are deemed suitable for use on a private message are enabled in response to the output.

In yet another embodiment of the invention, an alternative set of tools, e.g. known as "private message processing", which are appropriate for processing messages indicated to be private by the output are invoked in lieu of prior art set of messages processing tools which are employed for non-private messages.

Encryption of the information contained in the packets may be combined with the privacy attribute at the sender. Thus the content of the packets is assured privacy during message transfer across a switching network. Messages decryption is completed at the receiver upon detection of the privacy attribute and/or message encryption.

DETAILED DESCRIPTION

Figure 1:
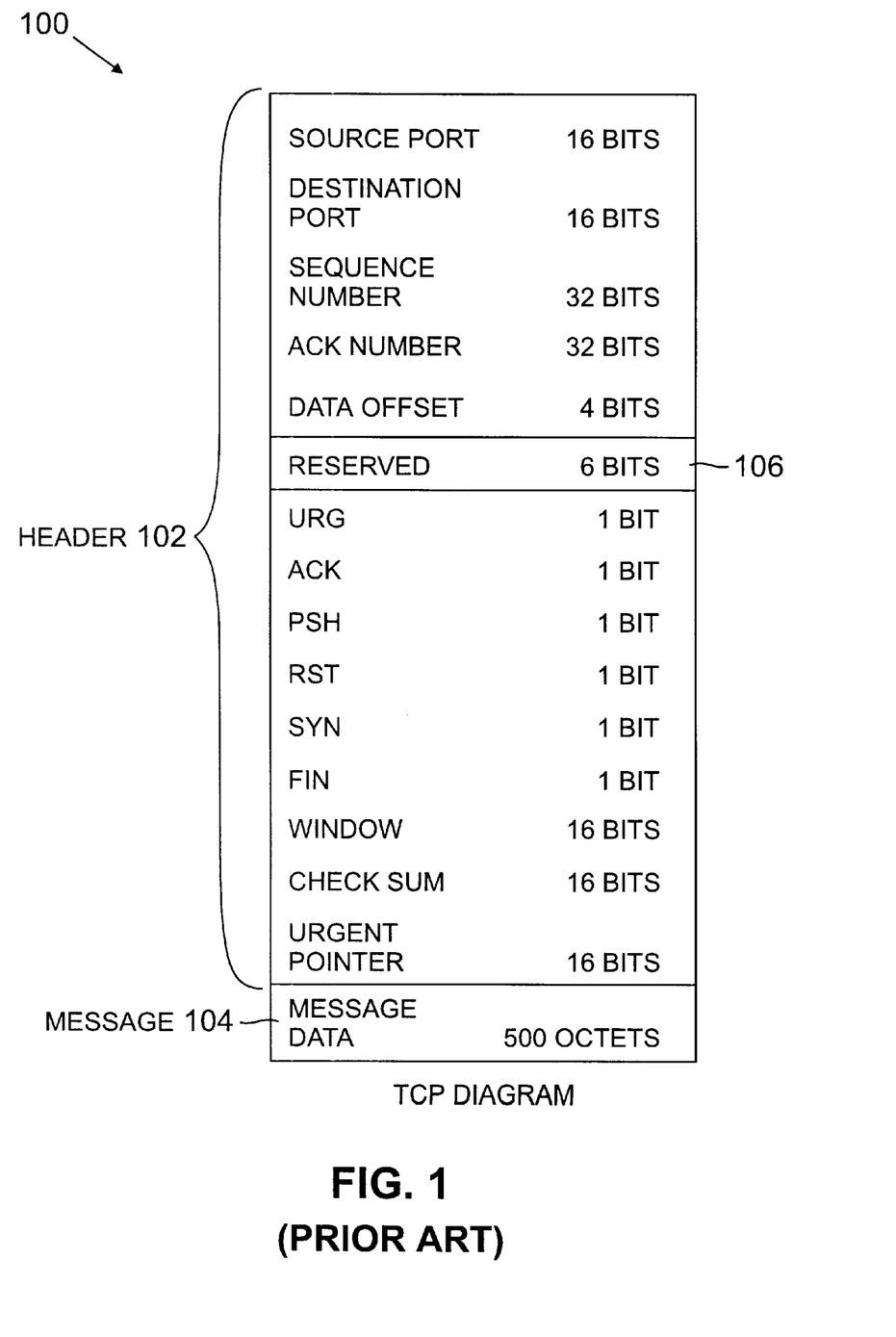
FIG. 1 is an exemplary TCP datagram (or packet) used for the transmission of an e-mail message of the prior art having a header and a body containing a message to be transmitted from a source port (sender) to a destination port (receiver)

Shown in FIG. 1 is an exemplary datagram (or packet) 100 of the prior art generally used for e-mail messages between a sending computer and a receiving computer connected in an internet network. Datagram 100 has a header 102 and a message 104. Within header 102 various bit allocations are made for identifying the sender and destination for message 104 within diagram 100. For example, 16 bits are allocated for the source port identifying the sender of the datagram. Another 16 bits are allocated for the identification of the destination port. Reserved bits 106 are also provided.

Upon arrival at the receiving computer (destination port), header 102 allows the concatenation of a string of packets (or datagrams) to re-constitute an e-mail message sent from the source port. The operation and function of various parts of datagram 100 is discussed in detail in Transmission Control Protocol—DARPA Internet Program Protocol Specification RFC 793, USC/Information Science Institute, NTIS AD Number A111091, September 1981, Postel, J, ed., and Internet Protocol Transition Workbook, SRI International, Menlo Park, Calif., and following improvements, all incorporated herein by reference in their entirety. As described in these references, a datagram of the structure shown in FIG. 1 is part of the Transmission Control Protocol, abbreviated TCP. Generally TCP is used with the Internet Protocol (IP), forming the TCP/IP family of protocols well known in the art. TCP/IP are generally also used with the Simple Mail Transfer Protocol (SMPT), as described by Jonathan B. Postal, RFC 821, dated August 1982, and following improvements, for the transmission of e-mail from a sending computer to a receiving computer.

It should be noted that the terms "datagram" "packet" often appear to be interchangeable. Datagrams is, in some respects more adequate when describing a TCP/IP environment. A datagram is a unit of data, which is what the TCP/IP protocols deal with. A packet is generally related to a physical expression of a train of bits traveling together in a transmission medium, such as a wire or optical cable. In some cases, a packet contains exactly on datagram. However, is other cases, a datagram may be made up of a plurality of packets. For example, the X.25 interface breaks up datagrams into 128 byte packets. Clearly, from an efficiency point of view, it is best to match transmission methods so that one packet corresponds to one datagram, thus eliminating the cost of conversion from packets to datagram.

Figure 2:
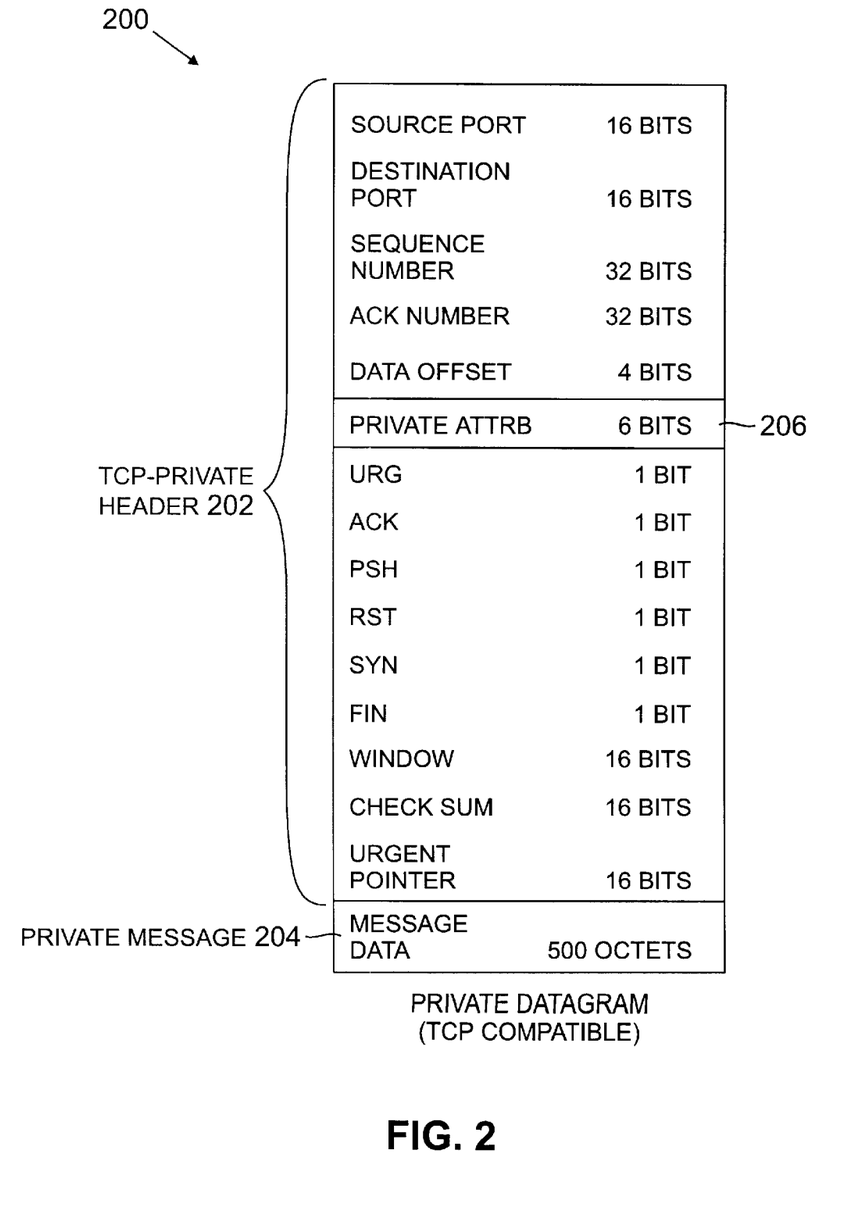
FIG. 2 is an exemplary TCP compatible datagram (or packet) characteristic a private e-mail transmission in accordance with the present invention wherein the header of the datagram contains up to a 6 bit privacy attribute that informs a resident private message processing function at the receiving computer of the private nature of the message and the desire of the sender to preclude further manipulation of the contents of the body of the message.

FIG. 2 describes a private datagram (or packet) 200 of the present invention, having message 204 and privacy attribute 206 within header 202. Privacy attribute 206, for example, has up to 6 bits and is substituted for reserved header 106 of FIG. 1 thereby maintaining compatibility with TCP requirements for datagrams. For this invention, for example, the bits necessary to form a privacy attribute within a datagram are taken from a reserved area or another unused location within the structure of the datagram, in full compliance with a protocol controlling the structure of the datagram. In response to detection of privacy attribute 206, a resident private message processing function at the receiving computer will re-configure application program, e-mail managers or browsers, such as, for example, Eudora, Microsoft Exchange, Navigator or Internet Explorer to disable, for example, edit, cut and paste, and re-transmit functions, thus allowing private text message 204 to be read but not modified or re-transmitted. In the alternative, the existing browser is completely disabled, and only certain functions, implemented by an add-on, private message receiving function is enabled. Generally, read, reply to sender, and delete functions are activated by the detection of the privacy attribute. An advantage of the structure shown in FIG. 2 is that it is compatible with existing TCP requirements. Thus, a sender may choose to send a private message even if the means for accommodating such a message do not exist at the receiver.

Figure 3:
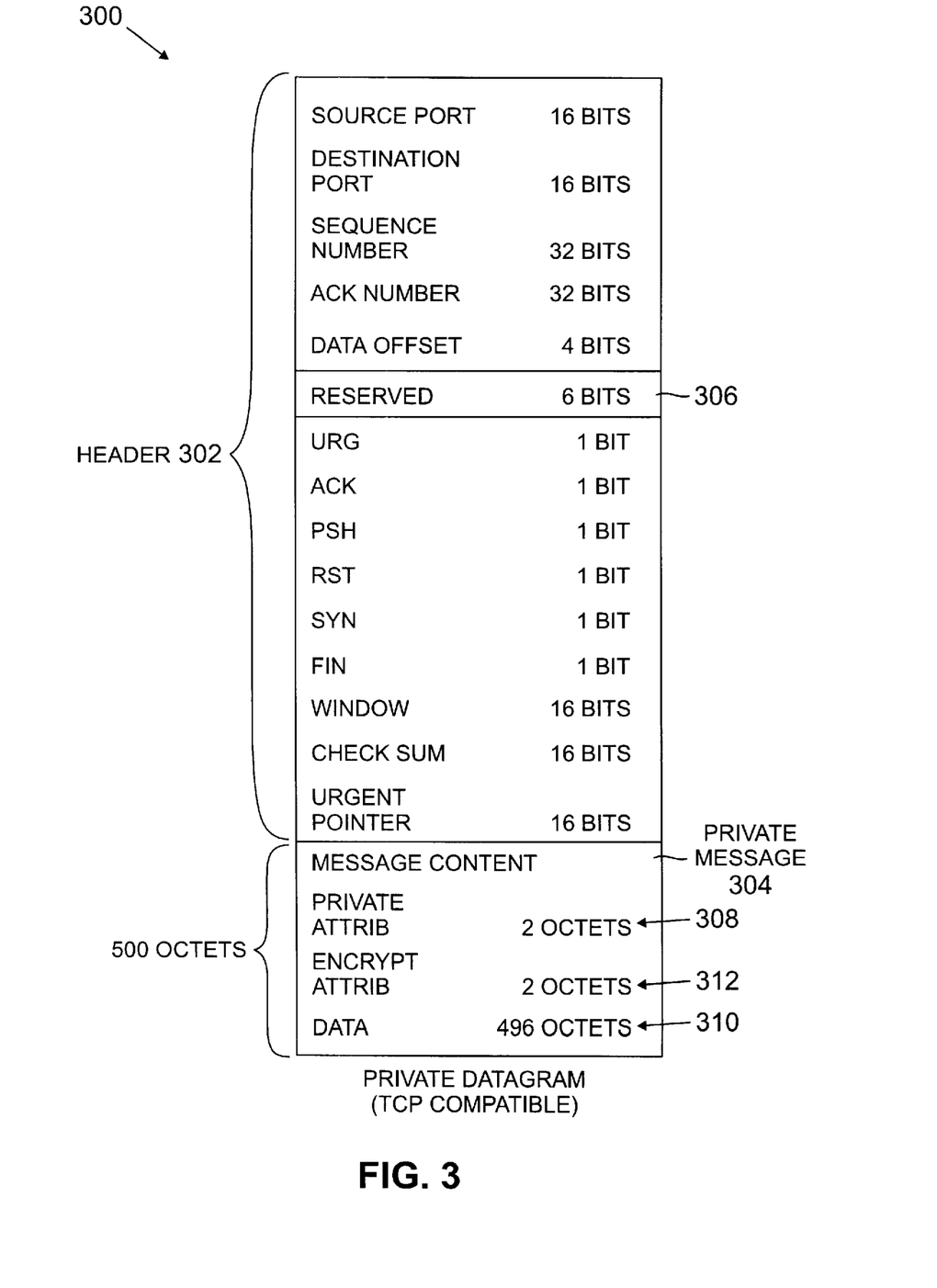
FIG. 3 is an exemplary datagram of a private e-mail packet in accordance with the present invention wherein the header of the datagram contains a 6 bit reserved space, and the data in the 500 octet has been altered to contain a privacy attribute as well as an encryption attribute.

FIG. 3 shows another embodiment of the present invention. Datagram 300 contains private message 304, header 302 and reserved bits 308. The bit length of datagram 300, header 302 and general structure is the same as datagram 100 of the prior art, thus preserving compatibility with TCP requirements. In this embodiment, datagram 300 contains 500 octets of data. Within these 500 octets of data, a privacy attribute 308 is formed, for example, from the first 2 octets within message 304.

Another feature, for example, independent of privacy attribute 308, is encryption attribute 312, also allocated 2 octets. With this exemplary allocation of bits within message 304, 496 octets remain for data transmission. Clearly, the allocation of 2 octets to privacy attribute 308 and another 2 octets to encryption attribute 312 can be changed to 3, 4, 5, 6 or any number of octets (in this exemplary embodiment, up to 500) to suit the exact protocol present within an intranet/internet system. Also, the position of privacy attribute 308 and encryption attribute 312 at the start of the 500 octet data portion of datagram 300 is only an example of a possible embodiment. The location of the privacy attribute and/or encryption attribute within a field of octets can be randomly selected.

In another embodiment, not shown in FIG. 3, 16 octets are allocated to each of privacy attribute 308 and encryption attribute 312. As an example of this case, the encryption attribute 312 occupies the last 16 octets in the 500 octet group while privacy attribute 308 occupies the first 16 octets in the 500 octet group.

Privacy attribute 308 has the same function to identify the message as private to a receiving computer as explained with regard to privacy attribute 206. As another example, encrypt attribute 312 contains the required decryption key to decrypt the message contained in data 310 of datagram 300. The key is provided for those instances where only a limited amount of privacy is required and limited encryption robustness is sufficient. This is applicable for example, when a sender wants to verify the existence of private message processing functions at the receiver. Clearly, the key for decryption need not be included in datagram 300 when the need for added security is desired.

Figure 4:
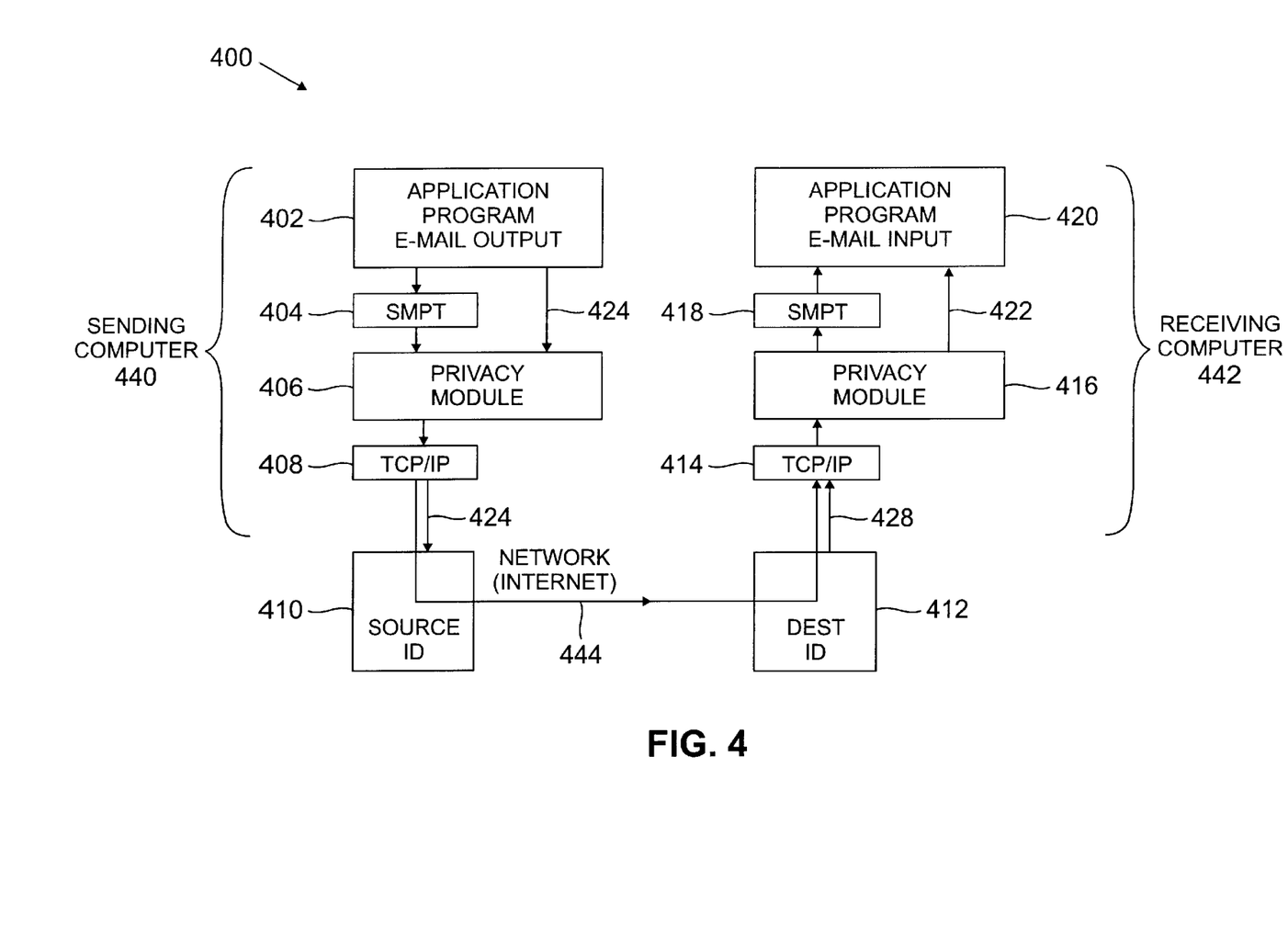
FIG. 4 is a high level block diagram in accordance with the present invention of the components associated with the transmission of a private message from a sending computer to a receiving computer.

FIG. 4 is an exemplary high level block diagram of the private mail system 400 of the present invention. A message is composed by the sender in application program 402. The message is processed typically by a Simple Mail Transfer Protocol (SMPT) 404, in accordance with RFC 821, by Jonathan B. Postel, dated August 1982. Concurrently, if privacy for the message is required, the sender activates private message processing function (or privacy module) 406 via link 424. Privacy module 406 converts output from SMPT 404 into packets, or datagrams, as shown and detailed in FIG. 2 and/or FIG. 3. These packets, or datagrams containing a privacy attribute, are now handled by the TCP/IP module 408 resident in the sending computer 440 and put into link 426. Link 426, for example, can be a local telephone line, an ethernet link or any other link to a (sending) server, or internet service provider 410. Service provider 410 re-transmits the packets, or datagrams, via, for example, public network 444, or other transmission ink, to a destination server, or host 412.

Host 412 relays the packets (or datagrams) using link 428 via TCP/IP 414 to privacy module 416 resident on the receiving computer 442. Privacy module 416, upon detection of a privacy attribute in the received packets performs two functions:

1. Generate an output 422 for enabling only certain permitted message processing functions, for example, only the read, erase and reply to sender function within application program 420. Conversely, output 422 disables functions present in e-mail application software available today, as, for example, Eudora, Microsoft Exchange, Navigator or Internet Explorer to insure that only the permitted set of editing functions are available at the receiver, such as, for example, read only, reply and erase. In the alternative, if selective functions cannot be disabled, the exemplary cited e-mail programs are fully disabled by overwriting certain memory area critical to their operation. Because application program 420 has been disabled by input 422, the original private text message cannot be edited (cut and paste), retransmitted, or combined with other text to form a new message by application 420. Likewise, a private message is precluded from being locally stored within receiving computer 442 by action of privacy module 416. Application 420 is generally an e-mail manager and/or browser.

2. Restructure the incoming packets for compatibility with application program 420. Typically SMPT 418 will perform some of the necessary conversion and may be convenient to use in this instance. Private message processing function 416 performs the same function in the event SMPT is not available.

Figure 5:
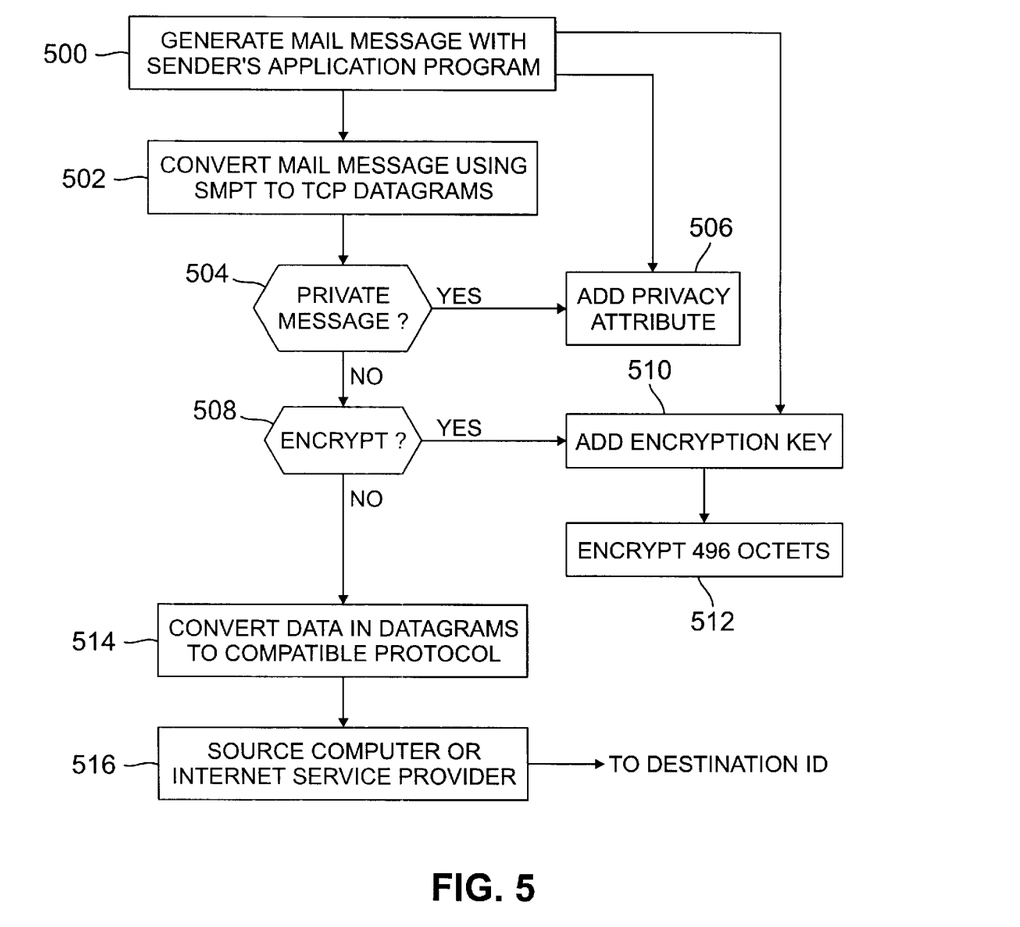
FIG. 5 is a high level flow diagram in accordance with the present invention of the operations to be performed to transmit a private message of this invention.

FIG. 5 details further an exemplary operation of the system at the sender's end in accordance with this invention. A message is generated with an e-mail manager or browser 500, such as, for example, Eudora, Microsoft Exchange, Navigator or Internet Explorer. The e-mail manager/browser has been modified to include a privacy activation function that allows for user designation of private encrypted and private unencrypted messages. Encrypted messages can have various degrees of security. The message is converted by SMPT function 502 into TCP compatible packets. If activated by application 500, a private attribute is added in logic 504 by module 506. If further requested by application 500, in logic 508, an encryption key is included by key generator 510 and the message is encrypted by encryption engine 512. Conversion unit 514 converts packets, now containing a privacy attribute and/or an encrypted message to a compatible protocol, typically TCP/IP. In accordance with one embodiment of this invention, as shown if FIG. 2 and FIG. 3 if only a private designation is desired, the datagram (or packet) generated from module 506 and logic 504 is generally already compatible with the TCP requirements. Conversion unit 514 is provided in the event a robust encryption algorithm is implemented requiring reconfiguration of the results from encryption engine 512 into, for example, a TC protocol compatible format.

The results from conversion unit 514 are transmitted to a source computer or internet service provider 516 benefiting from a high speed link to the public network, itself connected to the destination computer.

Figure 6:
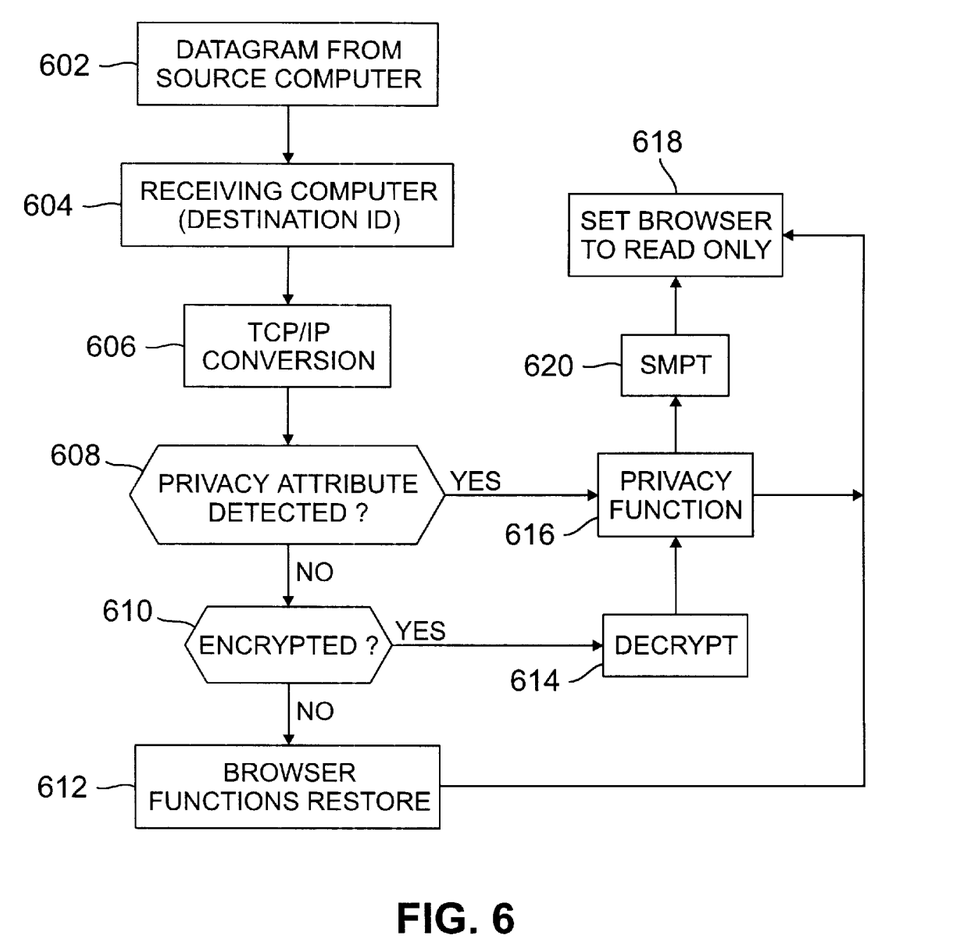
FIG. 6 is a high level flow diagram in accordance with the present invention of the operations to be performed to receive a private message of this invention.

FIG. 6 describes the high level receiver structure in accordance with this invention. Datagram (or packet) 602, containing the original private message, is received from source computer 516 via the public network or some other means of transmitting packets and datagrams by receiving computer 604, a destination computer. Following well known methods, the received datagram 602 is converted from the TCP/IP protocol by unit 606 into, generally, a datagram originally created by conversion unit 514 of FIG. 5.

The packets emerging from unit 606 are examined in logic block 608 for the presence of a privacy attribute, originally inserted by module 506. If a privacy attribute is detected, then privacy function 616 activates those functions of e-mail manager/browser 618 that are permitted for private message processing, thereby precluding editing and re-distribution of the incoming message. For example, privacy function 616 only activates the read, erase and reply to sender functions. These functions preclude storage of the message within the receiving computer.

It is envisioned that in certain installations the resident e-mail manager or browser will have private message processing capability implemented by functions which are different from those activated for non-private messages. If so, then privacy function 616 enables these functions within the receiving computer.

Logic block 610 detects encrypted packets or datagrams. If encrypted, the proper algorithm is called upon to perform the decryption in decrypt function 614. It is envisioned that only sensitive messages will be encrypted. For less sensitive messages, the encryption method may be as simple as changing all 1's to zeros and zeros to 1's in each datagram or packet. For a simple key encryption, each data portion of a datagram is X-ored with the encryption key.

Another function for the simple encryption of messages is to insure the presence of a private message processing function at the receiving computer. An encrypted message from a privacy seeking sender may read "Please return this message prior to receipt of copyrighted material-ID 75463". If the receiver has the proper private message processing function, the message will be decrypted, read and returned. This will assure the sender than a private message processing function is in place, and functioning at the receiving computer.

If no encryption is detected within the received datagram, and no privacy attribute is found, the e-mail manager/browser functions are unaffected as in block 612 until the arrival of the next datagram containing a privacy attribute.

Figure 7:
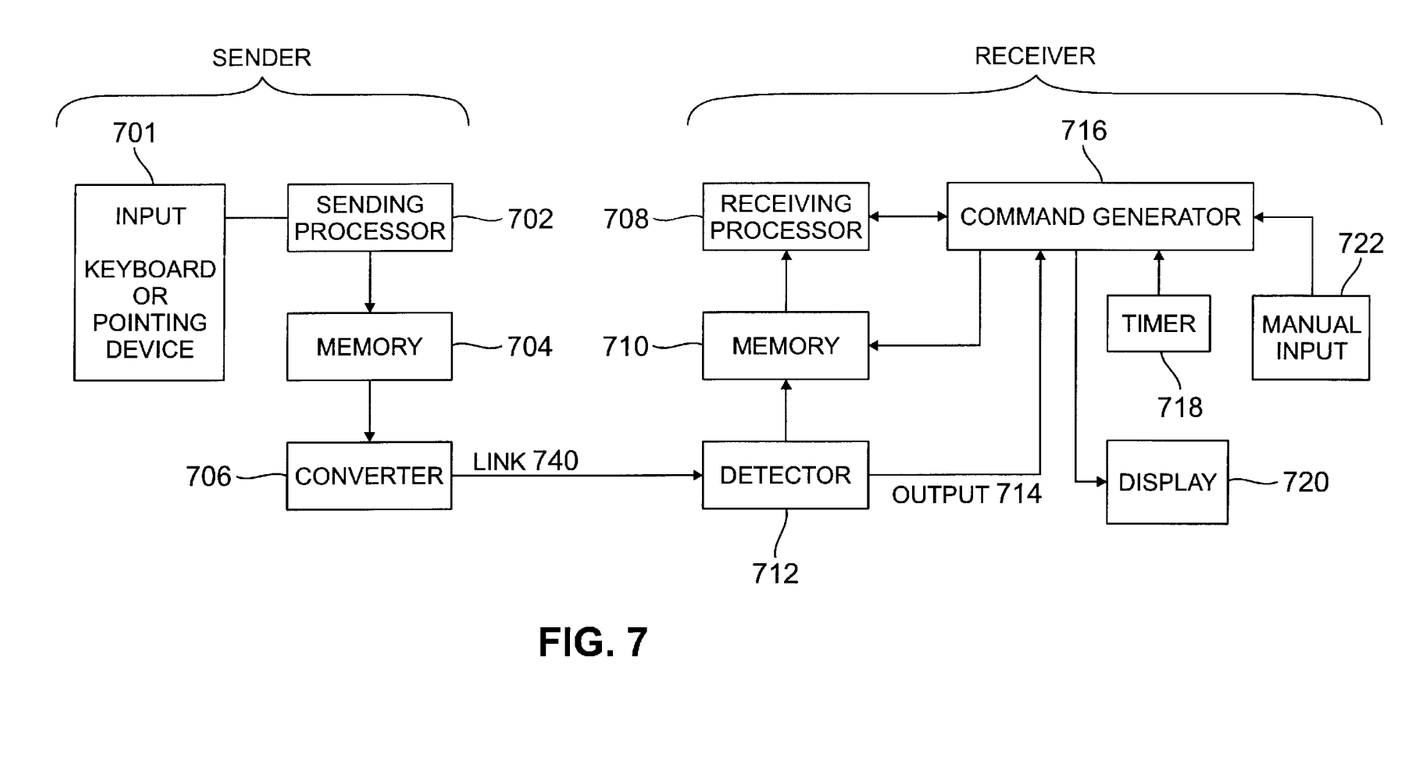
FIG. 7 is a high level hardware diagram of an exemplary embodiment of the transmitter and receiver of the present invention.

FIG. 7 describes an exemplary apparatus of the present invention for transmission of a private message from a sender to a receiver. A sender processor 702 has a memory 704. Processor 702 in interfaced to an input means such as a keyboard or pointing device 701 that facilitates input and storage of a message in memory 704 using processor 720. For a private message, a privacy attribute may be also stored for the message in memory 704. In the event a privacy attribute is combined with the content of a message, either in memory 704 or converter 706, a datagram or packet is produced having a privacy attribute. Converter 706 converts a message and privacy attributes into one or more packets (or datagrams) for transmission on link 740. Link 740 is any transmission medium, such as, for example, the public telephone switching network, satellite links, microwave links and the like capable of transmitting data from a sender to a receiver.

At the receiving end, a receiver processor 708, has a memory 710 for storing packets or datagrams containing the private message and the privacy attribute contained therein.

A detector 712 is provided for detecting the privacy attribute in packets or datagrams arriving on link 740. Detector 712 has an output 714. Output 714 is indicative of the detection of the private attribute within one or more packets or datagrams received on link 740. A command generator 716 is responsive to output 714 for enabling only the private message processing functions within the receiver.

Also, command generator 716 upon detection of output 714 disables or deletes message processing functions inconsistent with a private message within the receiver. Examples of disabled functions are re-transmit, edit, and store functions of previously cited e-mail managers or browsers.

One of the functions that may be enabled upon reception of the privacy attribute is deletion of the private message from memory 710 upon manual command from manual input 722. This input can be received for example, from a keyboard, a pushbutton, a mouse or another means of manually signaling activation of the delete function.

Yet another function that may be enabled at the receiver presents the private message in human perceivable form, e.g., on, display 720, or, using digital to speech synthesis, a speaker (not shown). Display 720 is not limited to a cathode ray tube, alphanumeric display, speaker or printer but can also be, for example, a simple on-off light, a buzzer or other means for indicating the presence of a private message to be retrieved from memory 710.

Other examples of message processing functions disabled at the receiver are the retransmission of the message to anyone other than the sender, and/or copying the private message from the receiver for storage or subsequent manipulation, redistribution and the like.

As another example, timer 718 initiates receiver processor 708 to overwrite contents of memory 710 containing the private message after a time interval following detection of the privacy attribute contained in the private message.

In another exemplary embodiment, sender processor 702 also encrypts the private message at the sender. Detector 712 at the receiver decrypts the private message and stores it in memory 710 for subsequent access.

Another private message processing function enabled at the receiver is the deletion of the private message upon a signal from manual input 722. Generally, the message stored in memory 710 at said receiver, is overwritten upon command initiated from manual input 722. Message deletion can also be completed from timer 718 by overwriting contents of memory 710 containing the private message. The timer allows a programmable time interval following the occurrence of output 714 for the private message to be read.

Alternatively, the functionality of detector 712 may be incorporated within processor 708, with detector 712 being simply a receiver.

All references cited in this document are incorporated herein in their entirety.

Although presented in exemplary fashion employing specific embodiments, the disclosed structures are not intended to be so limited. For example, as discussed in FIG. 4, many types of protocols can be used to transmit packets having a privacy attribute. The general applicability of the structures presented herein will be easily understood by one skilled in the art as covered by the scope of the claims recited below.

Those skilled in the art will also appreciate that numerous changes and modifications could be made to the embodiment describe herein without departing in any way from the invention. These changes and modifications and all obvious variations of the disclosed embodiment are intended to be embrace by the claims to the limits set by law.

What is claimed is:

1. A system for the transmission of a private message from a sender to a receiver using a Transmission Control Protocol having a header, said system comprising:
    a first 16 bits allocated to a source port identification within said header of said Transmission Control Protocol, said source port identifying said sender;
    a second 16 bits allocated to destination port identification within said header of said Transmission Control Protocol, said destination port identifying said receiver;
    six reserved bits within said header of said Transmission Control Protocol;
    means at said sender for inserting a privacy attribute into said private message said privacy attribute contained within said six reserved bits; and
    means for disabling one or more message processing functions at said receiver in response to detection of said privacy attribute contained within said six reserved bits as part of said Transmission Control Protocol, said private message contained within a group of 500 octets following said header.

2. A system for the transmission of a private message from a sender to a receiver as described in claim 1 wherein detection of said privacy attribute within said 6 reserved bits enables a reply addressed only to said source port originating said private message.

3. A system for the transmission of a private message from a sender to a receiver as described in claim 1 wherein detection of said privacy attribute enables deletion of said private message stored in said receiver upon manual command from said receiver.

4. A system for the transmission of a private message from a sender to a receiver as described in claim 1 wherein detection of said privacy attribute enables presentation of said private message in human perceivable form.

5. A system for the transmission of a private message from a sender to a receiver as described in claim 1 wherein said private message is deleted after a time interval at said receiver after detection of said privacy attribute.

6. A system for the transmission of a private message from a sender to a receiver as described in claim 1 further including means for encrypting said private message.

7. A system for the transmission of a private message from a sender to a receiver, said private message formed from one or more packets each of said packets having a header part and a data part in accordance with a Transmission Control Protocol, said system comprising:
    a first 16 bits allocated to a source port identification within said header part of said Transmission Control Protocol, said source port identifying said sender part;
    a second 16 bits allocated to destination port identification within said header part of said Transmission Control Protocol, said destination port identifying said receiver;
    six reserved bits within said header part of said Transmission Control Protocol;
    means at said sender for inserting a privacy attribute into said six reserved bits of said header part for one or more packets for transmission from said sender to said receiver, said one or more packets compatible with said Transmission Control Protocol;
    detecting means at said receiver for detecting within said header part of each one or more packets said privacy attribute, said detecting means having an output generated upon detection of said privacy attribute; and means for disabling one or more message processing functions in response to said output said private message contained within a group of 500 octets following said header.

8. A system for the transmission of a private message between a sender and a receiver as described in claim 7 wherein said privacy attribute is one or more octets located within said data portion of each of said packets.

9. A system for the transmission of a private message between a sender and a receiver as described in claim 7 wherein said private message is encrypted into said data part of said packets in accordance with an encryption algorithm key and an encryption algorithm, identification of said encryption algorithm and said key contained within said six reserved bits is said header part.

10. A system for the transmission of a private message between a sender and a receiver as described in claim 9 wherein said encryption key used for said encryption is changed for each of said packet.

11. A system for the transmission of a private message between a sender and a receiver as described in claim 9 wherein said encryption algorithm used for said encryption is changed for each of said packet.

12. A system for the transmission of a private message between a sender and a receiver as described in claim 7 wherein said output enables a means for manually deleting said private message.

13. A system for the transmission of a private message between a sender and a receiver as described in claim 7 wherein said output enables presentation of said private message in human perceivable form.

14. A system for the transmission of a private message between a sender and a receiver as described in claim 7 wherein said output disables presentation of said private message in human perceivable form after a time interval.

15. A method for the transmission of a message from a sender to a receiver using a Transmission Control Protocol having a header, where a first 16 bits are allocated to a source port identification within said header of said Transmission Control Protocol, a second 16 bits are allocated to a destination port identification within said header of said Transmission Control Protocol, and six reserved bits are allocated within said header of said Transmission Control Protocol, comprising the step of disabling one or more message processing functions at said receiver in response to detecting a privacy attribute within said six reserved bits, said private message contained within a group of 500 octets following said header.

16. A method for the transmission of a message from a sender to a receiver as described in claim 15 wherein one of said message processing functions disabled in response to said privacy attribute is storing of said message.

17. A method for the transmission of a message from a sender to a receiver as described in claim 15 wherein one of said message processing functions disabled in response to said privacy attribute is retransmission of said message to anyone other than said sender.

18. A method for the transmission of a message from a sender to a receiver as described in claim 15 wherein one of said message processing functions disabled in response to said privacy attribute is editing of said message.

19. A method for the transmission of a message from a sender to a receiver as described in claim 15 wherein one of said message processing functions disabled in response to said privacy attribute is copying of said message.

20. A method for the transmission of a private message from a sender to a receiver as described in claim 15 further including the step of deleting of said private message after a time interval in response to detecting said privacy attribute within said message.

21. A method for the transmission of a private message from a sender to a receiver as described in claim 15 further including the step of encrypting said private message at said sender, said encryption identified by a bit within said six reserved bits of said header in said Transmission Control Protocol.

22. A method for the transmission of a private message from a sender to a receiver, said private message formed from one or more Transmission Control Protocol packets, each packet having a header, where a first 16 bits are allocated to a source port identification within said header of said Transmission Control Protocol a second 16 bits are allocated to a destination port identification within said header of said Transmission Control Protocol, and six reserved bits are allocated within said header of said Transmission Control Protocol, said method comprising the steps of:

forming one or more of said packets at said sender, each of said packets having a header part and a data part, said one or more packets compatible with said Transmission Control Protocol; and inserting a privacy attribute into said one or more packets within said six reserved bits of said Transmission Control Protocol, said private message contained within a group of 500 octets following said header;

said method further comprising the step of disabling one or more message processing functions residing at said receiver upon detection of said privacy attribute at said receiver.

23. A method for the transmission of a private message between a sender and a receiver as described in claim 22 wherein said privacy attribute is inserted within said header of at least one of said packets.

24. A method for the transmission of a private message between a sender and a receiver as described in claim 22 wherein said privacy attribute is placed in one or more octets located within said data portion of at least one of said packets.

25. A method for the transmission of a private message between a sender and a receiver as described in claim 22 including the additional step of encrypting said private message contained in said packets in accordance with an encryption key and an encryption algorithm.

26. A method for the transmission of a private message between a sender and a receiver as described in claim 22 including the additional step of including said encryption key used for said encryption in said six reserved bits of said Transmission Control Protocol header of at least one of said packets.

27. A method for the transmission of a private message between a sender and a receiver as described in claim 22 including the step of changing said encryption key for each of said packets.

28. A method for the transmission of a private message between a sender and a receiver as described in claim 22 including the step of changing said encryption algorithm for said encryption for each of said packets.

29. A method for the transmission of a private message between a sender and a receiver as described in claim 22, further including the steps of presenting said message in human perceivable form and enabling manual deletion of said private message upon detection of said privacy attribute.

30. A method for the transmission of a private message between a sender and a receiver as described in claim 22 further including the steps of presenting said message in human perceivable form, enabling manual deletion of said private message, and replying only to said sender of said message upon detection of said privacy attribute.

31. A method for the transmission of a private message between a sender and a receiver as described in claim 22 wherein said receiver overwrites said private message after a time interval.

32. An apparatus for transmission of a private message from a sender to a receiver using a Transmission Control Protocol having a header where a first 16 bits are allocated to a source port identification, a second 16 bits are allocated to a destination port identification, and six reserved bits are allocated within said header of said Transmission Control Protocol, comprising
- a sender processor, said sender processor having a plurality of registers, each of said registers longer than or equal to said six reserved bits, said processor interfaced to an input means, said input means for generating said private message; and
- a converter, using said sender processor for embedding a privacy attribute within said six reserved bits in said header of said private message, said private message contained within a group of 500 octets following said header;
- said sender processor further comprising means for disabling one or more message processing functions upon detection of said privacy attribute at said sender.

33. An apparatus for the transmission of a private message from a sender to a receiver as described in claim 32 wherein said converter at said receiver encrypts said private message.

34. An apparatus for transmission of a private message from a sender to a receiver using a Transmission Control Protocol having a header where a first 16 bits within said header are allocated to a source port identification, a second 16 bits are allocated to a destination port identification, and six reserved bits are allocated to a privacy attribute within said header of said Transmission Control Protocol, comprising:
- a detector for generating an output in response to detection of a privacy attribute within said six reserved bits in said header of said private message; and
- one or more enableable message processing functions, said functions being enabled as a function of detection of said output from said detector wherein said private message is contained within a group of 500 octets following said header.

35. An apparatus for the transmission of a private message from a sender to a receiver as described in claim 34 wherein a function for verifying a reply addressed only to said sender of said private message is enabled in response to said output.

36. An apparatus for the transmission of a private message from a sender to a receiver as described in claim 34 wherein said output enables one of said message processing function that performs deletion of said message stored in said receiver upon manual command from said receiver.

37. An apparatus for the transmission of a private message from a sender to a receiver as described in claim 34 wherein a timer deletes said private message at said receiver after a time interval in response to detecting said privacy attribute.

38. An apparatus for the transmission of a private message from a sender to a receive as described in claim 34 wherein said detector at said receiver decrypts said private message.

39. An apparatus for receiving a message from a sender using a Transmission Control Protocol having a header where a first 16 bits are allocated to a source port identification of said Transmission Control Protocol, a second 16 bits are allocated to a destination port identification of said Transmission Control Protocol, and six reserved bits are allocated within said header of said Transmission Control Protocol, comprising:
- a receiver for receiving a message said message containing said six reserved bits within said header and 500 octets following said header; and
- a processor for detecting a privacy attribute within said six reserved bits of said header, said processor having a plurality of registers longer than or equal to said six reserved bits for processing said message wherein said processor disables one or more message processing functions for said message in response to detection of said privacy attribute.

40. A receiver as described in claim 39 wherein one of said message processing functions disabled in response to detection of said privacy attribute is storing of said message.

41. A receiver as described in claim 39 wherein one of said message processing functions disabled in response to detection of said privacy attribute is retransmission of said message to anyone other than said sender.

42. A receiver as described in claim 39 wherein one of said message processing functions disabled in response to detection of said privacy attribute is editing of said message.

43. A receiver as described in claim 39 wherein one of said message processing function disabled in response to detection of said privacy attribute is copying of said message.

* * * * *